United States Patent [19]

Brendel et al.

[11] Patent Number: 4,955,120

[45] Date of Patent: Sep. 11, 1990

[54] HYDROSTATICALLY SUPPORTED ROLL

[75] Inventors: Bernhard Brendel, Gregath; Klaus Kubik, Tönisvorst; Karl-Heinz Küsters, Krefeld, all of Fed. Rep. of Germany

[73] Assignee: Eduard Küsters Maschinenfabrik GmbH & Co. KG, Krefeld, Fed. Rep. of Germany

[21] Appl. No.: 337,254

[22] Filed: Apr. 13, 1989

[30] Foreign Application Priority Data

Apr. 22, 1988 [DE] Fed. Rep. of Germany ....... 3813598

[51] Int. Cl.$^5$ .......................................... B21B 13/02
[52] U.S. Cl. .................................. 29/113.2; 29/116.2
[58] Field of Search ..................... 29/112, 113, 113.2, 29/116.1, 116.2; 72/243, 245; 100/162 B

[56] References Cited

U.S. PATENT DOCUMENTS

| | | | |
|---|---|---|---|
| 3,997,953 | 12/1976 | Christ et al. | 29/116 |
| 4,186,472 | 2/1980 | Biondetti | 29/116.2 X |
| 4,282,639 | 8/1981 | Christ et al. | 29/116.2 |
| 4,726,691 | 2/1988 | Lehmann | 384/99 |
| 4,729,153 | 3/1988 | Pav et al. | 29/116 |
| 4,751,775 | 6/1988 | Kubik | 29/116.2 |
| 4,757,582 | 7/1988 | Verkasalo | 29/116.2 |
| 4,776,069 | 10/1988 | Snellman | 29/113.1 X |
| 4,821,384 | 4/1989 | Arav | 29/116.2 X |
| 4,856,157 | 8/1989 | Küsters . | |

FOREIGN PATENT DOCUMENTS

| | | |
|---|---|---|
| 0201783 | 11/1983 | European Pat. Off. . |
| 0252251 | 1/1988 | European Pat. Off. . |
| 2503051 | 7/1978 | Fed. Rep. of Germany . |
| 2902956 | 5/1983 | Fed. Rep. of Germany . |
| 577598 | 7/1976 | Switzerland . |

Primary Examiner—Timothy V. Eley
Assistant Examiner—Frances Chin
Attorney, Agent, or Firm—Kenyon & Kenyon

[57] ABSTRACT

A hydrostatically supported roll has several hydrostatic support elements supporting the inner circumference of a rotating hollow roll. The hydrostatic elements are supported on the stationary crosshead that extends through the rotating roll to form a clearance space therewith. Each hydrostatic element has support pockets supplied with a first pressurized fluid via choke canals and branch lines connected to a flow-controlled pump delivering a constant volume of first pressurized liquid, regardless of the counterpressure in the support pockets. The first pressurized liquid fed to the support pockets is temperature-controlled. The support pockets are separated from essentially closed pressure chambers, which are supplied with a second pressure-controlled pressurized liquid from separate feedlines for pressing the hydrostatic elements against the inner circumference of the hollow roll to support same. The second pressurized liquid is not communicated to the inner circumference of the hollow roll. Therefore, independent of any pressure change in the pressure chambers, the same quantity of first pressurized liquid passes over the edges of the support pockets to ensure that the amount of heat transferred to the inner circumference of the hollow roll remains constant.

9 Claims, 3 Drawing Sheets

HYDROSTATICALLY SUPPORTED ROLL

BACKGROUND OF THE INVENTION

The invention relates generally to rolls and, more particularly, to improved temperature control in a hydrostatically supported roll having hydrostatic elements supported by the crosshead that are forced by a pressurized liquid against the inner circumference of the hollow roll for supporting same.

A hydrostatically supported roll is disclosed in Swiss Patent No. 577598. In this patent the support elements are formed as support plungers or pistons guided in cylinder bores disposed in the side of the crosshead facing the roll gap. Choke holes connect support pockets formed on the side of the support plungers facing the inner circumference of the hollow roll with the pressure chamber formed in the cylinder bore below the support plunger. Thus, the pressure chamber and the support pockets are connected to each Other and pressurized liquid passes from the pressure chamber of each support plunger into the support pockets, of which several usually are provided for stabilization. A small amount of pressurized liquid flows over the edge of the support pockets and forms a supporting liquid film such that the support plungers act against the inner circumference of the hollow roll free of metallic friction. A single row of support plungers can be provided, which are supplied with pressurized liquid either individually and independently of each other, in groups or jointly. However, if required, several rows of support plungers can be provided in one roll with the rows being relatively offset from each other in the circumferential direction.

In the roll disclosed in Swiss Patent No. 577598 liquid leaking from the support plungers collects in the space between the inner circumference of the hollow roll and the crosshead, after which it is conducted to a heat exchanger and then to a supply tank. A pump feeds the collected liquid under pressure back to the individual pressure chambers under the support plungers. With this known construction, different pressures maybe fed to individual support elements or to groups of support elements and the line pressure profile generated by the hydrostatic support elements can be adjusted. Due to heat transfer between the pressurized liquid heated or cooled by the heat exchanger and the inner circumference of the hollow roll, the temperature appearing at the outer circumference of the hollow roll is uniform over the width of the web in rolls of the type described above, i.e., rolls in which the heat exchanger constitutes the only temperature adjusting device and is common to all of the support plungers.

If in such a roll the line pressure distribution must be adjusted and the pressure of the pressurized liquid at a given support element accordingly must be increased, for instance, more pressurized liquid flows over the edge of the support element than before the adjustment. Since, in such a roll, the heat transfer depends heavily on the amount of liquid flowing over the edge of the support element at the inner circumference of the hollow roll, more heat is transferred to the inner circumference of the hollow roll in the vicinity of this support element and the temperature distribution along the hollow roll thereby is changed.

One problem in this type of roll is that the pressure and temperature cannot be adjusted independently of each other at a given support element. A change in the line pressure distribution always is accompanied by a corresponding change in the temperature distribution.

FIG. 5 of Swiss Patent No. 577598 shows an embodiment that attempted to correct this shortcoming by providing individual supplementary heaters in the feedline to the individual support elements or to the groups of support elements, in addition to the heat exchanger. In this manner, the temperature achieved by the heat exchanger could be modified. For more stringent temperature operating requirements, this solution is unsatisfactory because the supplemental heaters only provide very sluggish control of temperature conditions. In addition, the quantity of leakage liquid flowing at the hydrostatic element changes upon a change in viscosity caused by a temperature change at the same pressure and, therefore, an change in the pressure conditions occurs. Therefore, actual independence of the temperature and pressure distributions is not achieved.

In German Patent No. 2902956, the hollow roll is temperature-controlled via temperature-controlled pressurized liquid escaping at the support plungers. Supplemental heating is provided, which can be separately controlled in sections. The temperature-controlled pressurized liquid is sprayed against the inner circumference of the hollow roll.

In European Patent No. 201783, heat is transmitted to the hollow roll via temperature control of the pressurized liquid. To change the temperature distribution, the quantity of pressurized liquid transported at a given support plunger is adjusted, thereby adjusting the pressure exerted at this point. In order to compensate for the attendant change in the line pressure distribution, a further row of support elements is provided on the opposite side of the crosshead to automatically equalize the change in the line pressure distribution that occurred. In this manner, a change in the temperature of the roll surface can be achieved without changing the temperature of the pressurized liquid.

In German Patent No. 2503051, the support elements do not provide any temperature control function. This function is accomplished by a row of support elements formed on the opposite side of the crosshead, similar to heat transfer elements, which receive a temperature-controlled pressurized liquid.

In all of the rolls of last three mentioned patents, additional structural elements must be accommodated in the already cramped space in the interior of the hollow roll. When these elements are mounted in holes in the crosshead, provision of the additional elements undesirably weakens the crosshead. Furthermore, the additional cost brought about by providing these elements is a considerable disadvantage.

SUMMARY OF THE INVENTION

The invention is directed to providing an improved hydrostatically supported roll that avoids the disadvantages and drawbacks of the prior art in which the line pressure and the temperature distributions can be independently adjusted along the length of the hollow roll.

The invention accomplishes these goals by providing a hydrostatically supported roll comprising a rotating hollow roll having an outer working roll circumference, a stationary crosshead extending through the hollow roll to form surrounding clearance space with the inner circumference of the hollow roll, a plurality of hydrostatic elements supported by the crosshead and arranged in at least one row along the crosshead for supporting the inner circumference of the hollow roll, with each hydrostatic element having: (i) support pockets formed in an outer contact surface of the hydrostatic element, with the pockets being open toward the inner circumference of the hollow roll and bounded by surrounding edge whereby a first pressurized liquid conducted to the support pockets transmits contact pressure to the inner circumference of the hollow roll for supporting same; (ii) a pressure chamber to which a second pressurized liquid is conducted for pressing its respective hydrostatic element against the inner circumference of the hollow roll with a predetermined force, with the pressure chamber at of least one of the hydrostatic elements being separate from its respective support pockets; and (iii) means for adjusting the predetermined force independently of the other hydrostatic elements, a first temperature control device for controlling the temperature of the first pressurized liquid, and a flow control device connected to the support pockets for providing a constant flow of first pressurized liquid thereto.

The first pressurized liquid fed to the support pockets may be the same liquid as the second pressurized liquid, but it is maintained separate from the second pressurized liquid fed to the, pressure chamber. At the same time, the quantity of the first pressurized liquid fed to the support pockets is controlled. This ensures that the amount of first pressurized liquid flowing over the edge of the hydrostatic support element, when the pressing force of the hydrostatic support element changes, does not change thereby preventing the undesirable change in the amount of heat transmitted. Thus, the heat transmitted is independent of the pressing force provided by the support element. The pressure in the pressure chamber of the support elements governs the supporting contact pressure. Since the second pressurized liquid in the pressure chamber does not escape into the space between the hollow roll and the crosshead, it does not influence the heat transfer. If the pressure in the pressure chamber is increased, the quantity of liquid transported to the support pockets is maintained constant by the constant flow device, although its pressure varies in accordance with the pressure in the pressure chamber.

In this manner, the amount of heat transferred by a support element is not influenced by changes in the support pressure at the support element. Therefore, the line pressure distribution and temperature distribution over the roll can be adjusted independently of each other without the need for additional compensating elements, such as additional heating elements or additional rows of support elements.

The idea of separating and controlling the quantity of the pressurized liquid fed to the support pockets from the pressurized liquid fed to the pressure chamber is disclosed, per se, in European Patent No. 252251. However, in this patent, this was implemented to save pump power. The present invention lies in the utilization of this concept for controlling the temperature in hydrostatically supported rolls to considerably improve the operation of heated rolls in a simple manner.

In perhaps the most general form of the invention, each support plunger is associated with its own temperature control device and the various temperature control devices may be adjusted independently of each other. In this manner, a temperature profile may be obtained that is not influenced by changes in the pressure profile.

In practice, the invention may be used to accomplish the frequent goal of maintaining a given uniform temperature over the working width of the roll, even if the line pressure distribution changes. To achieve this a goal, a simplified embodiment may be provided in which separate temperature control devices for individual feedlines are not provided, but rather a common temperature control device for several or even all of the support elements is provided. For example, an arrangement in which all of the inner support elements of the roll are connected to a common temperature control device, while each of the two outer support elements are connected to another temperature control device is advantageous to compensate for fringe effects.

The requirements of uniform and constant temperature are stringent in some roll applications, such as in rolls that are employed in so-called "fleece calendars", which operate at temperatures at the surface of the roll on the order of 250° C. and must be constant over the working width of the roll, i.e., can vary no more than $+1°$. These operating requirements are difficult to achieve with a roll having a length of several meters operating at considerable speeds because slight effects can produce critical temperature variations. This applies, for instance, to so-called "second-order effects", which occur upon a change in pressure, which, in turn, results in a change in the size of the gap between the contact surface of a support element and the inner circumference of the hollow roll. The change in gap size changes the amount of heat produced by the hydrodynamic friction of the pressurized liquid passing through the gap. In addition, the change in the viscosity of the pressurized liquid supplied to the support pockets at different temperatures can influence the gap size and the heat distribution.

In the event of temperature variations occurring along the length of the hollow roll that result from such secondary effects, it may be difficult to achieve uniform temperature in a roll provided with a temperature control device common to several support elements. Therefore, according to the invention, an individual temperature control device may be provided in each of the feedlines to the support pockets in a position downstream of the common temperature control device. The individual temperature control devices only suppress second-order effects and, accordingly, need not supply large amounts of power. For instance, individual heating sleeves provided at the feedlines or a small heating cartridge protruding into the liquid may be sufficient.

An orifice may be employed instead of a choke hole to make the throttling device required in the feedline to the support pockets independent of viscosity and, therefore, independent of the temperature of the pressurized liquid. The orifice has a small cross section and only a small longitudinal extent in the direction of the feedline.

Further features, embodiments and advantages of the invention are apparent from consideration of the following detailed description, drawing and appended claims.

DETAILED DESCRIPTION

Figure 1:
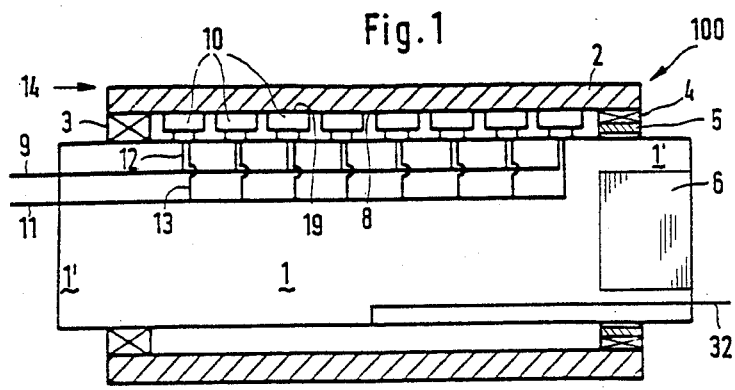
FIG. 1 illustrates is a longitudinal sectional view through a roll constructed according to the principles of the invention.

The roll 100 shown in FIG. 1 comprises a stationary crosshead 1, which extends lengthwise through a rotating hollow roll 2 to form an annular clearance space therewith. The ends 1' of the crosshead 1 protrude from the hollow roll 2 and are supported in a roll stand or by the wings of a calendar or in a similar manner (not shown).

At the left end of the hollow roll 2 shown in FIG. 1, one type of rotational support is shown in which the hollow roll 2 is rotatably supported on the crosshead 1 via an antifriction bearing 3. At the right end of the hollow roll 2, a different type of support is shown in which the hollow roll 2 is supported via a bearing 4 located on a ring guide 5, which can be radially displaced relative to the crosshead by a small amount, but cannot rotate. At the crosshead 1, a linear guide in the form of two opposite flat surfaces 6 is provided. The guide ring 5 can slide on these surfaces via corresponding guiding surfaces (not shown). The bearing 3 transmits forces from the hollow roll 2 to the crosshead 1 in the action direction of the roll 100, i.e., in the plane perpendicular to the longitudinal axis of the roll in which the resultant force of the line pressure distribution acts. The bearing 4 provides guidance only in a direction perpendicular to the action plane. In the action plane, forces cannot be transmitted from the hollow roll to the crosshead because the guide ring 5 is displacable in this plane. It is understood that in practice the support arrangements at the ends of the hollow roll are the same. The illustration in FIG. 1 merely explains some of the rolls support arrangements of that may be employed.

In the embodiment shown in FIG. 1, eight support elements 10 are equidistantly distributed over the length of the hollow roll 2. Elements 10 are supported at the outer circumference of crosshead 1 such that their support surfaces 19 abut the inner circumference 8 of the hollow roll 2 thereby obviating the need to further weaken the crosshead by provision of cylinder bores in the crosshead for the support elements. The support elements 10 are supplied via the common feedlines 9, 11 and branch lines 12, 13, which connect the individual support elements 10 to two separate pressurized liquids. One of the liquids forces the support elements 10 against the inner circumference 8 of the hollow roll 2 and the other liquid forms a supporting film between the roll 2 and support elements 10 at the inner circumference 8.

In FIG. 1 the roll gap 14, through which a web of material is conducted, is located on the top of the roll, i.e., a counterroll is disposed above the outer working circumference of the hollow roll 2. In this manner, when the hollow roll 2 is loaded, the load is supported in the inner region of its longitudinal extent by the support elements 10. This load is transmitted to the crosshead 1, which bends under the action of the line load, thereby preventing the hollow roll 2 from changing its dimensions due to the load.

Figure 2:
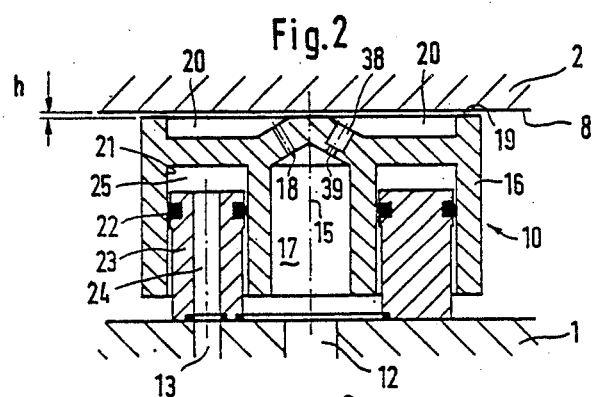
FIG. 2 illustrates is a longitudinal sectional view through one of the individual support elements shown in FIG. 1.
Figure 3:
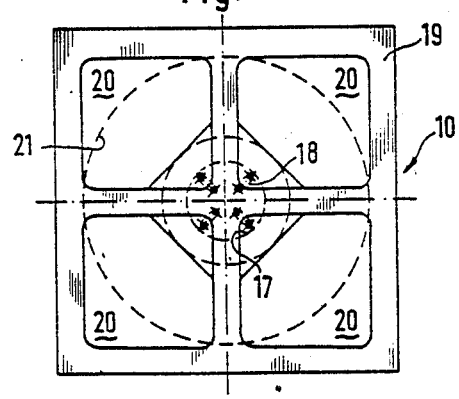
FIG. 3 illustrates a top view of the support element shown in FIG. 2.

An individual support element 10 is shown in FIG. 2. Element 10 has a longitudinal axis 15, which is parallel to the action direction of the roll and about which a central, discontinuous drill hole 17 is arranged. On the left side of drill hole 17, as shown in FIG. 2, choke canals 18 are provided, which lead from the drill hole 17 into support pockets 20. The top of the housing 16 of the support element 10 has an approximately square-shaped top, as shown FIG. 3, and is curved to form support surface 19, which faces the inner circumference 8 of the hollow roll 2 to conform thereto, i.e., the curved support surface 19 is cylindrically shaped in the circumferential direction and has a diameter that corresponds to the circumference.

Four shallow support pockets 20 are formed in the support surface 19. The pockets are separated interiorly from each other and have a surrounding edge or rim. Each pocket 20 is in communication with the hole 17 via one of the choke holes 18. The provision of four support pockets 20 stabilizes the support elements 10 as they rest against the inner circumference 8 separated therefrom by a fluid film having a uniform gap width h (FIG. 2).

The choking action of the choke holes 18 depends upon the viscosity of the pressurized liquid used, which, in turn, depends upon its temperature. If holes 17 are supplied with pressurized liquids at the same pressure, but at a different temperature, the pressure drop occurring in the choke holes 18 is different, and a corresponding reaction on the pressure in the support pockets 20 occurs. In order to avoid this effect, orifices may be used instead of the choke holes to provide a choking effect. The orifices are largely independent of viscosity. The right side of the hole 17 in FIG. 2 illustrates, as an alternative choke element, an orifice 39 in the feed canal 38 for the right-hand side support pocket 20. As illustrated in FIG. 2, the orifice 39 has a small cross sectional area and a small extent in the longitudinal direction, i.e., the flow direction. The orifice 39, which would, of course, provided for in all four support pockets 20 is preferred if a temperature sensitive pressurized liquid must be supplied to the individual support elements without affecting the pressure distribution.

Below the support pockets 20 an annular cylinder 21 is formed in housing 16 concentric with the axis 15. A ring-shaped piston 23 is engaged in the cylinder 21, which is sealed via seals 22 and is tightly fastened on the top side of the crosshead 1. The housing 16 of the support element 10 can be slidably displaced relative to piston 23 in a direction parallel to the axis 15. The piston 23 has a hole 24 parallel to the axis 15 that communicates with a branch line 13 such that the pressure chamber 25, which is formed above the ring piston 23 and is closed except for hole 24, is connected to the feedline 11. The hole 17, which opens toward the interior of the ring piston 23, communicates with the branch line 12 connected to the feedline 9.

The operation of the roll 100 is explained with reference to FIG. 4. The inlet to pump 30 is connected to supply tank 26 for conducting liquid contained therein through a heat exchanger 27 in which the pressurized liquid is heated to a high temperature in the range of 300° C. Of course, lower temperatures and even cooling of the liquid below the ambient temperature is possible. After flowing through the heat exchanger 27, the now temperature-controlled pressurized liquid is transported into the line 9 from which it is fed via branch lines 12 to the holes 17 of the individual support elements and the support pockets 20 via the choke canals 18, 38. Since the support elements are surrounded on all sides by the edge of the support surface 19 and rest substantially tightly against the inner circumference 8 of the hollow roll 2, a pressure builds up in the support pockets 20 that hydrostatically acts against the inner circumference 8 of the hollow roll 2. If the pressure in pockets 20 rises, the inner circumference 8 is somewhat lifted off the contact surface 19, whereby pressurized liquid from the individual support pockets 20 flows from the support pockets over the edge to the interior of the roll. The pressure in the support pockets 20 then immediately drops because of the choke elements 18, 39 whereby the gap h between the contact surface 19 and the inner circumference surface 8 is reduced. In this manner, a state of equilibrium exists for a predetermined gap size h.

It is essential that the pump 30 be a quantity controlling flow device, i.e., a flow meter. Thus, pump 30 may be either a flow control pump, itself, or its output may be connected to a flow control valve. In this manner, the pump 30 delivers a constant flow or quantity of pressurized liquid into the feedline 9 and, hence, into the support pockets 20, regardless of the counterpressures therein.

The return of pump 40 also is connected to supply tank 26 for supplying liquid therefrom to a pressure control valve 28 disposed downstream of the outlet of pump 40. Pressure control valve 28 ensures that only pressurized liquid at a predetermined pressure controlled by valve 28 is conducted to the line 11 and, hence, communicated via the branch lines 13 to the pressure chambers 25 of the individual support elements 10. In the simple embodiment shown here, pressurized liquid at the same pressure is applied to the pressure chambers of all of the support elements 10.

The pressure in chambers 25 determines the force with which the housing 16 of the support elements 10 is pressed against the inner circumference 8 of the hollow roll 2. Accordingly, the pressure in the support pockets 20 thereby is influenced. At a predetermined pressure in chambers 25 lifting of the roll 2 from the contact surface 19 and formation of corresponding gap h occurs. If the pressure at pressure control valve 28 is increased, the flow-controlled pump 30 must increase its output because it must now transport the same quantity of pressurized liquid against an increased pressure. The quantity of pressurized liquid that flows over the edge of the support pockets 20 at the contact surface 19 and, which has been temperature-controlled in the heat exchanger 27, remains the same for all pressures present at the pressure control valve 28. This constant quantity of pressurized liquid determines the degree of heat transfer to the hollow roll 2, which, therefore, is not influenced by changes in pressure at the pressure control valve 28.

Figure 4:
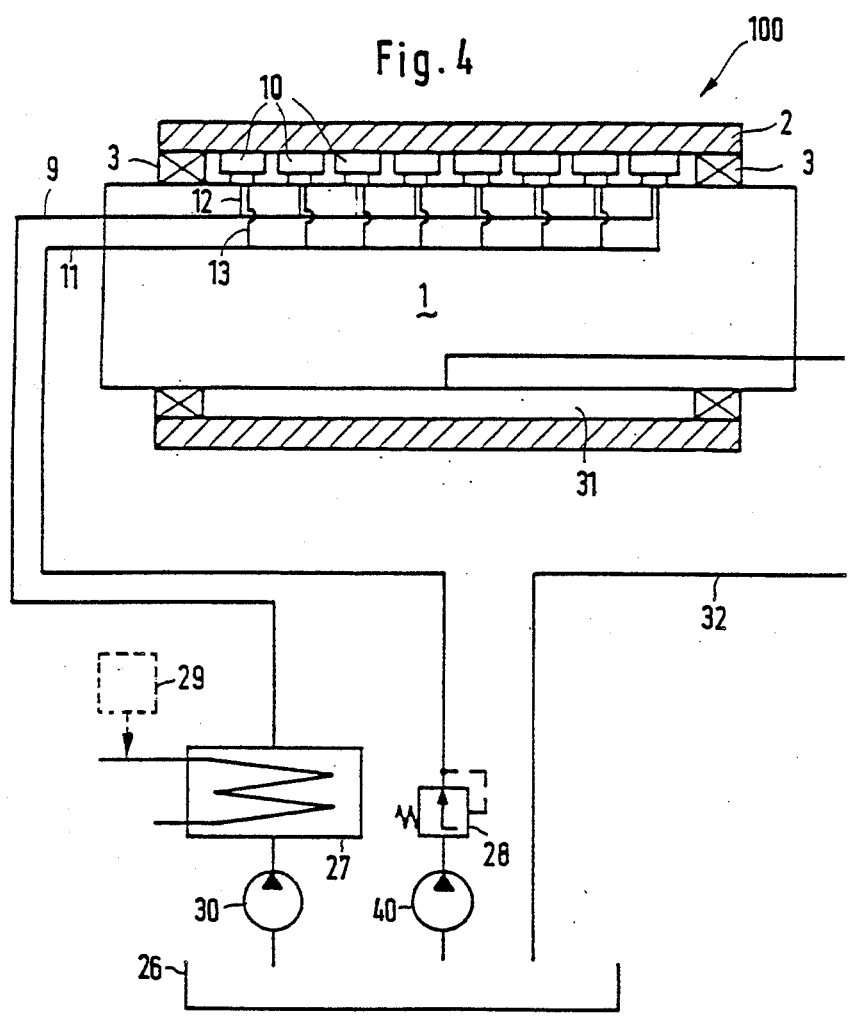
FIG. 4 is a schematic representation of a roll of the invention having a common temperature control device for all of the support elements.

The roll 100 of FIG. 4 is a single-zone arrangement that does not provide for temperature compensation between any actual measured value and a reference value. To provide for correction of the temperature adjusted by the heat exchanger, a temperature adjusting unit 29 may be provided as indicated by the dashed lines in FIG. 4. The liquid leaking past the support elements 10 through the gap h is drawn off from the space 31 between the crosshead 1 and the hollow roll 2 by a line 32 for return to the supply tank 26.

Figure 5:
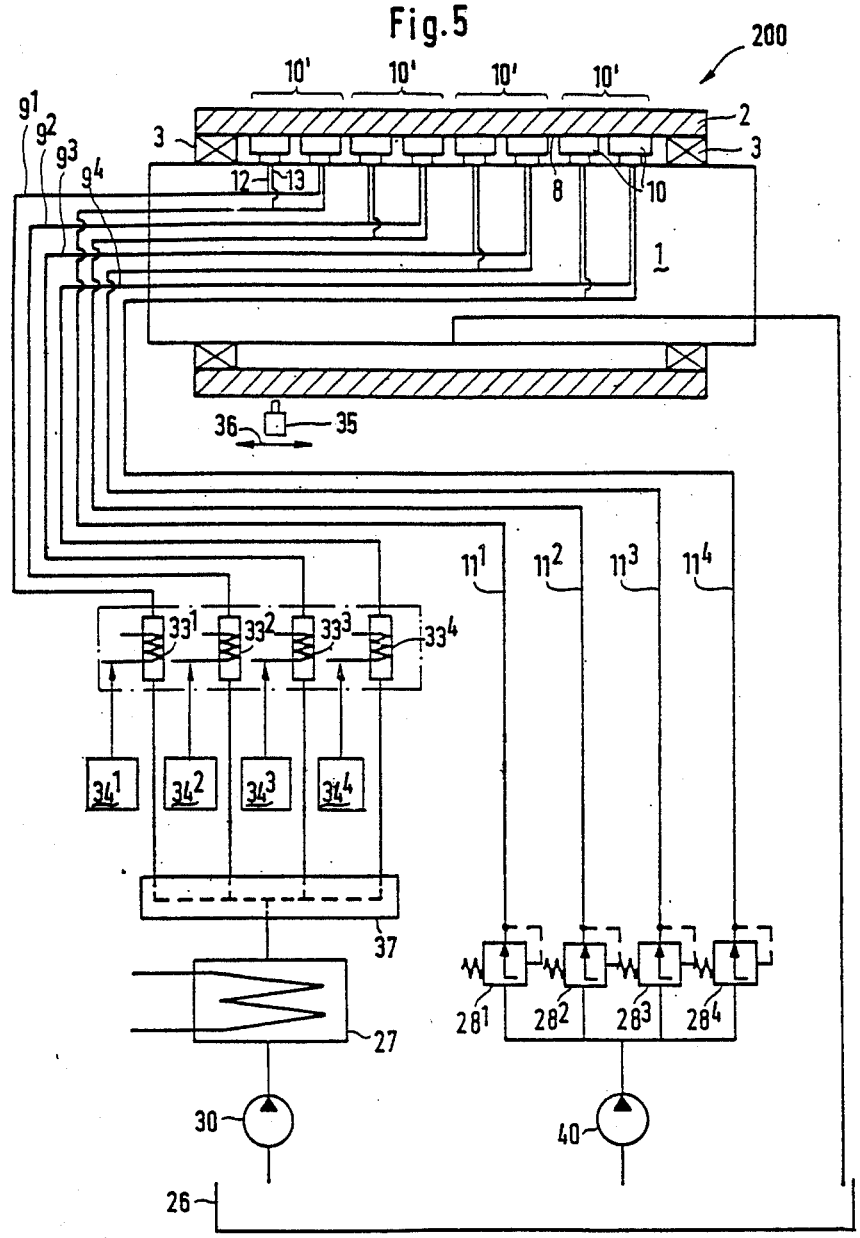
FIG. 5 is a schematic representation of a roll of the invention having a common temperature control device and individual temperature control devices associated with groups of support elements.

In FIG. 5 a further embodiment of the invention in the form of a roll 200 is shown. Eight support elements 10 are combined into four groups 10', of respectively adjacent support elements 10. Each group has a respective feedline $9^1$, $11^1$; $9^2$, $11^2$; etc., for conducting pressurized liquid to the support pockets 20 and the pressure chambers 25. The flow-controlled pump 30 supplies liquid from the supply tank 26 to pockets 20 at a variable pressure, which depends upon the counterpressure in the pockets. A volume of pressurized liquid, which remains constant for all counterpressures, is pumped by pump 30 through the heat exchanger 27 and into a manifold unit 37 in which the flow volume is divided uniformly over the four feedlines $9^1$, $9^2$, $9^3$, $9^4$ associated with the four groups 10'. Before the pressurized liquid flows into the individual support elements 10, it passes through individual temperature control devices $33^1$, $33^2$; $33^3$, $33^4$, one of which is arranged in a respective feedlines $9^1$, $9^2$, $9^3$, $9^4$. The temperature control devices $33^1$, $33^2$; $33^3$, $33^4$ are controlled by a respective control unit $34^1$, $34^2$, $34^3$, $34^4$, which may receive controlling signals from a computer (not shown). These signals are based upon measured values transmitted to the computer from a temperature sensing device 35, which is moved back and forth in the direction of the arrow 36 along the outside of the hollow roll 20 to determine the temperature distribution along the hollow roll 2. For instance, the desired temperature distribution may be a uniform temperature across the longitudinal extent of the roll.

Associated with a respective one of the four groups 10' of support elements 10 are four pressure setting valves $28^1$, $28^2$, $28^3$, $28^4$, which can be operated independently of each other to bring the pressurized liquid in the feedlines $11^1$, $11^2$, $11^3$, $11^4$ fed by the pump 40 to desired pressures independently of the pressures in the other feedlines. A change in the line pressure distribution, which may be effectuated by suitable operation of the pressure setting valves $28^1$, etc., does not change the temperature distribution because the quantity of pressurized liquid flowing at the individual support elements 10 via pockets 20 always remains the same by virtue of the constant flow provided thereto by pump 30.

The effect of the temperature adjustment provided by the devices $33^1$, etc., may be to provide an uniform temperature over the length of the hollow roll 2, or an intended nonuniform temperature distribution, for instance, a temperature rise or drop at the roll edges.

What is claimed is:
1. A hydrostatically supported roll comprising:
 (a) a rotating hollow roll having an outer working roll circumference;
 (b) a stationary crosshead extending through the hollow roll to form surrounding clearance space with an inner circumference of the hollow roll;
 (c) a plurality of hydrostatic elements supported by the crosshead and arranged in at least one row along the crosshead for supporting the inner circumference of the hollow roll, each hydrostatic element having,
  (i) support pockets formed in an outer contact surface of the hydrostatic element, said pockets being open toward the inner circumference of the hollow roll and bounded by a surrounding edge spaced from the inner circumference when a first pressurized liquid conducted to the support pockets flows over the surrounding edge to form a liquid film transmitting contact pressure to the inner circumference of the hollow roll for supporting same;
  (ii) a pressure chamber to which a second pressurized liquid is conducted for pressing the hydrostatic element against the inner circumference of the hollow roll with a predetermined force, with the pressure chamber of at least one of the hydrostatic elements being separate from its support pockets; and (iii) means for adjusting the predetermined force independently of the other hydrostatic elements by adjusting the pressure in the pressure chamber;

(d) a first temperature control device for controlling the temperature of the first pressurized liquid, which transmits heat to the hollow roll as the first pressurized liquid flows over the surrounding edges of the support pockets; and (e) a flow control device connected to the support pockets controlling the flow of first pressurized liquid to provide a constant flow of the first pressurized liquid over the surrounding edges of the support pockets.

2. The roll according to claim 1 further comprising a branch line provided for each hydrostatic element connected between the respective support pockets and a feedline communicating with said flow control device, said feedline conducting the first pressurized liquid through said first temperature control device.

3. The roll according to claim 2 wherein downstream of the first temperature control device said feedline branches into a plurality of conduits leading to the respective branch lines of the hydrostatic elements, each of said conduits includes a second individual temperature control device.

4. The roll according to claim 2 wherein at least one of the support pockets in at least one of the hydrostatic elements has an orifice disposed in a feed canal connected between said at least one support pocket and its respective branch line.

5. The roll according to claim 1 wherein said flow control device comprises a pump delivering a constant quantity of said first pressurized liquid to the support pockets of the hydrostatic elements.

6. The roll according to claim 1 wherein said flow control device comprises a pump and a separate flow control valve delivering a constant quantity of said first pressurized liquid to the support pockets of the hydrostatic elements.

7. The roll according to claim 1 wherein said means for adjusting the predetermined force independently of the other hydrostatic elements comprises a pressure control valve.

8. The roll according to claim 1 wherein said first and second pressurized liquids comprise a single liquid maintained substantially separate from each other by the pressure chamber and support pockets of the hydrostatic elements.

9. The roll according to claim 1 wherein said at least one row of support elements is supported on an outer circumference of the crosshead.

* * * * *

UNITED STATES PATENT AND TRADEMARK OFFICE
CERTIFICATE OF CORRECTION

PATENT NO. : 4,955,120

DATED : September 11, 1990

INVENTOR(S) : Bernhard Brendel et al.

It is certified that error appears in the above-identified patent and that said Letters Patent is hereby corrected as shown below:

In Column 4, line 19/20, change "...no more than $+1°$..." to read --no more than $\pm 1°$.--

Signed and Sealed this

Seventeenth Day of March, 1992

*Attest:*

HARRY F. MANBECK, JR.

*Attesting Officer*     *Commissioner of Patents and Trademarks*